Inventor
Adolf Schneider
By William Clinton
Attorney

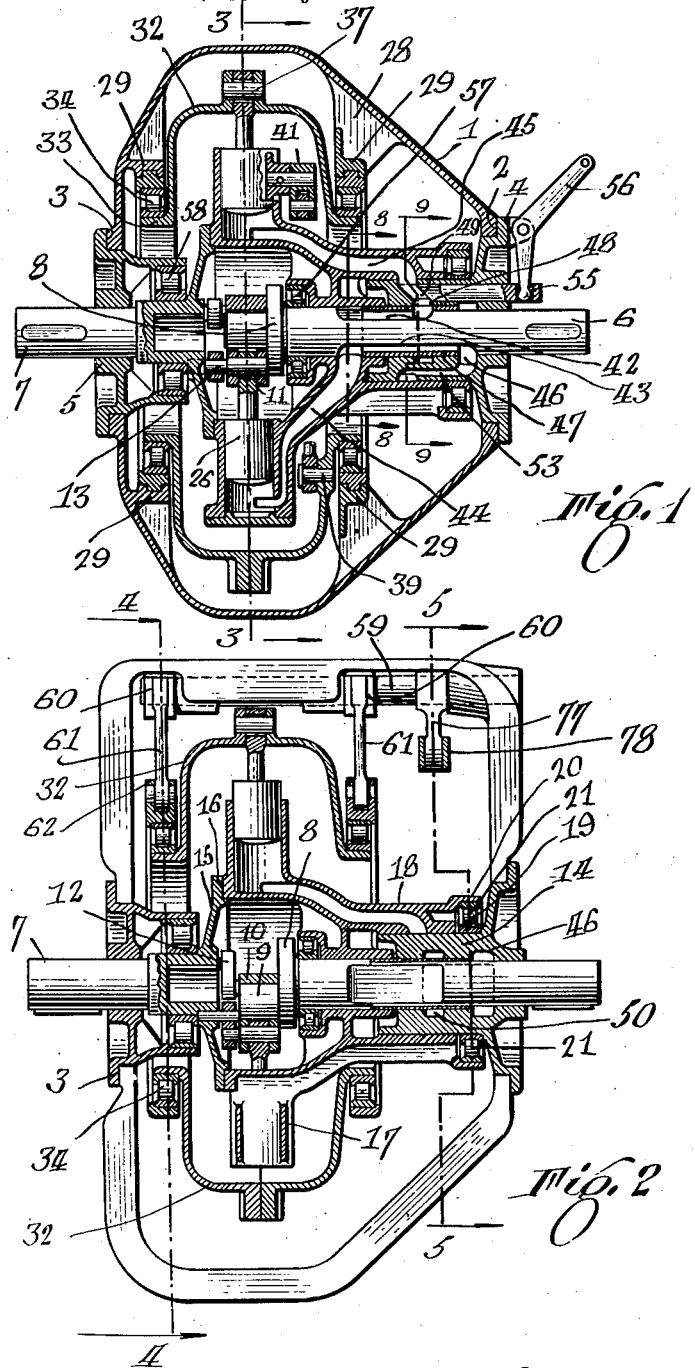

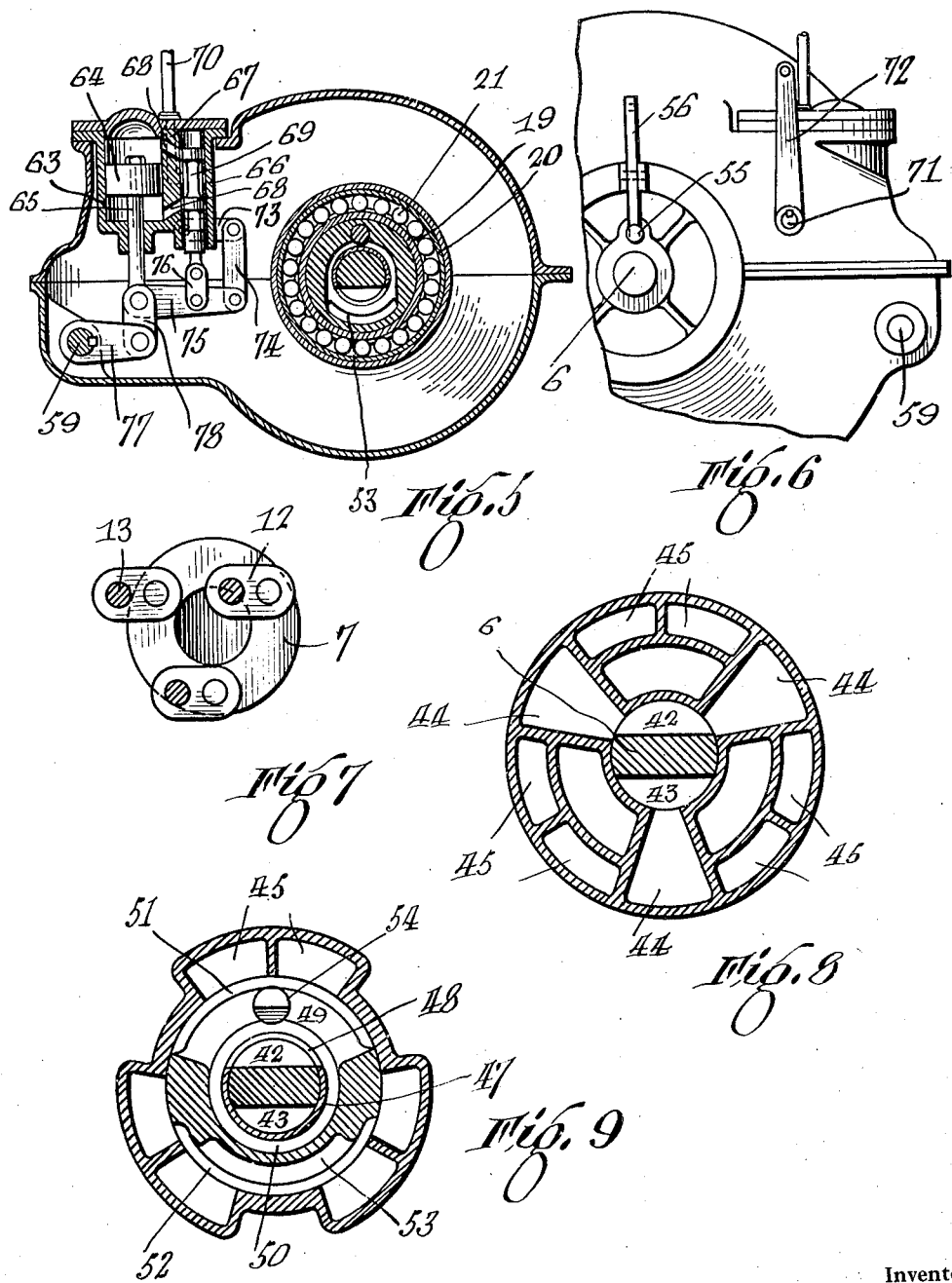

Patented Oct. 26, 1926.

1,604,321

UNITED STATES PATENT OFFICE.

ADOLF SCHNEIDER, OF MONTREAL, QUEBEC, CANADA.

VARIABLE-SPEED-TRANSMISSION APPARATUS.

Application filed May 28, 1925. Serial No. 33,546.

The present invention pertains to a variable speed transmission apparatus in the form of a fluid driving gear for transmitting power from a driving shaft to a driven shaft.

The apparatus is of the type embodying a rotary cylinder block having primary pistons actuated by the driving shaft and arranged to pump fluid to secondary pistons in the same block, the secondary pistons acting on a rotor which is connected to impart movement to the driven shaft. The principal object and novelty of the invention reside in the fact that both the primary and secondary cylinders are formed in the same rotary cylinder block and in substantially the same plane.

Variations in the speed of the driven shaft are obtained by adjusting the centric relation of the rotor to the cylinder block or driving shaft, both the block and the shaft having fixed centres. To accomplish this function, the rotor in addition to being mounted in suitable rolling bearings is also slidably supported in tracks, and an appropriate mechanism is provided for moving the rotor in its tracks.

On the inner end of the driving shaft is mounted a crank loosely carrying a plate which is pivotally joined to the pistons in the primary cylinders. As these pistons, during rotation of the driving shaft, pump fluid into the secondary cylinders, the pistons in the secondary cylinders exercise through their piston rods a non-radial thrust on the rotor when the latter is eccentric to the cylinder block. This action results in rotation of the rotor which is connected to the secondary shaft preferably through the cylinder block.

The primary cylinders are so arranged that some of them are compressing while the remainder are expanding. A further feature of the invention, in this connection, is a valve arrangement for placing the pressure end of the compressing cylinders in communication with the suction end of the expanding cylinders. When this adjustment is made, there is merely a circulation among the primary cylinders without any action in the secondary cylinders, as a result of which the rotor and consequently the driven shaft are not moved.

The invention is fully disclosed in the following description and in the accompanying drawings in which;

Figure 1 is a longitudinal section of the device, showing the driving and driven shafts mostly in elevation;

Figure 2 is a horizontal section at right angles to Figure 1, also showing the driving and driven shafts mostly in elevation;

Figure 5 is a section on the line 5—5 of Figure 2;

Figure 6 is a fragmentary end view;

Figure 7 is a section at the link connection between the driving and driven shafts, showing the connecting links and the end of the driven shaft in elevation;

Figure 8 is a section on the line 8—8 of Figure 1;

Figure 9 is a section on the line 9—9 of Figure 1.

Reference to these views will now be made by use of like characters which are employed to designate corresponding parts throughout.

Figure 3:
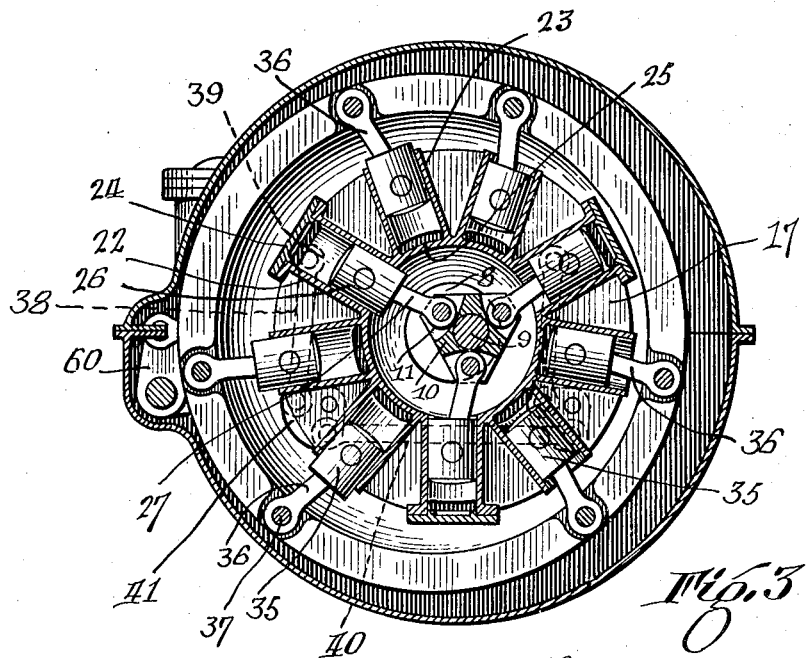
Figure 3 is a section on the line 3—3 of Figure 1.
Figure 4:
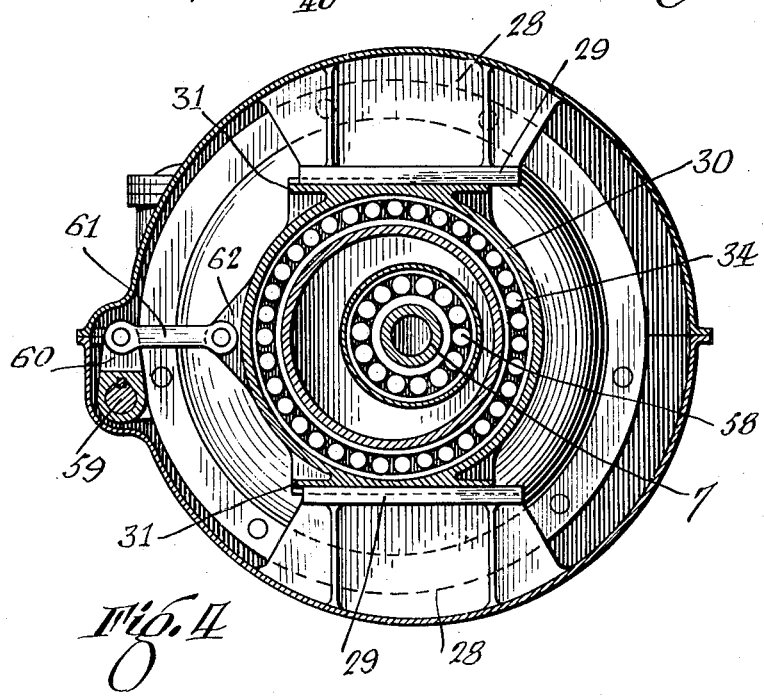
Figure 4 is a section on the line 4—4 of Figure 2.

The apparatus is housed in a casing 1, having openings 2 and 3 at its ends, these openings being closed by bearing plates 4 and 5 respectively. A driving shaft 6 and a driven shaft 7 are journaled respectively in the plates 4 and 5. The inner end of the driving shaft carries a disc 8 from which extends an eccentrically disposed crank pin 9. On the pin is loosely mounted a polygonal plate or web 10 having slots 11 cut in its corners as may be seen by reference to Figures 1 and 3. To the inner end of the shaft 7 are pivoted a plurality of links 12 which are equal in number and spacing to the slotted corners of the web. Pins 13 are passed through the corners and into the remaining ends of the links 12. The effective length of each link is equal to the distance between the centres of the shaft 6 and pin 9, so that the links do not serve to transmit motion from the driving to the driven shaft but merely prevent the web from becoming bound on the crank pin 9.

The plate 4 is extended inwardly in the form of a distributor core 14 surrounding the shaft 6. According to Figures 1 and 2, the inner end of the shaft 7 is formed with an integral plate or flange 15 in which is cut a groove 16. The ends of the two shafts are surrounded by a circular cylinder block 17 which is supported by having its inner circumference at one edge fixed in the groove 16 and formed at the other edge of the inner circumference with an integral distributor body 18 surrounding the core 14. The latter and the outer end of the body are equipped with ball race rings 19 and 20 respectively between which is disposed a plurality of roller bearings 21 to diminish the friction between the distributor body and core when these parts are in relative rotation.

The cylinder block is formed with a plurality of radial cylinders, one group 22 of which is open at the inner end while the remaining group 23 is open at the outer end. The former group is closed at the outer end by plates 24 while the second group is closed at the inner end by the inner wall 25 of the cylinder block. The former group 22 and its associated parts is termed the primary unit and the remaining group and parts connected therewith is designated as the secondary group, for the reason that the first group is actuated from the driving shaft 6 while the second group serves to transmit motion to the driven shaft 7. Although in the present instance there are three primary cylinders and six secondary cylinders, the number and ratio of these members may be varied to suit particular requirements.

The pistons 26 contained in the primary cylinders have their connecting rods 27 received at their free ends in the slots 11 of the plate 10 and held therein by the pins 13 which join the links 12 to the driven shaft 7.

From the inner walls of the housing 1 are projected four webs 28 alined in pairs and having parallel guides 29 formed at their inner edges. In each pair of opposed guides is mounted a rotor retaining ring 30 by means of shoes 31 received in the guides. Each ring serves to support a rotor section 32 by means of a restricted annular flange 33 formed on the rotor and projecting into the confines of the corresponding ring and spaced from the latter by roller bearings 34. The sections 32 are joined in any suitable manner, and form a rotor which encloses the cylinder block 17 as clearly shown in Figures 1 and 2. The pistons 35 in the secondary cylinders 23 have their piston rods 36 pivotally retained between the rotor sections by means of suitable pins 37. The cylinder block is connected to the rotor by a linkage comprising two members 38 attached to the rotor at 39 and an intermediate link 40 attached to the members 38 by coupling plates 41.

The driving shaft 6 has a longitudinal pocket 42 opposite which is a similar but longer pocket 43. In the distributor body 18 are formed a plurality of conduits 44 extending from the outer end of the primary cylinders 22 to the pockets 42 and 43 as shown in Figure 1. Similarly, conduits 45 extend from the inner ends of the secondary cylinders 23 to a circle around the shaft at the outer end of the shorter pocket 42. At the outer end of the longer pocket 43, a groove 46 is formed in the core 14 around the shaft 6. The shaft is surrounded by a sleeve 47 which is spaced between the outer wall of the groove 46 and the inner ends of the pockets. The sleeve has an opening or slot 48 at the outer end of the pocket 42. In the distributor core 14 is cut a duct 49 of sufficient extent circumferentially to bring two of the secondary conduits 45 into communication with the slot 48 when the parts are in the particular position shown in Figures 1 and 9. The distributor core is formed with another groove 50 communicating with the duct 49, whereby the pocket 42 is at all times in communication with the secondary conduits 45 entering the duct 49. While the duct 49 is inclined as shown in Figure 1, there is also formed an arcuate groove 51 co-extensive therewith which, strictly speaking, places the conduits 45 into communication with the duct. Opposed to this groove is a similar groove 52 of the same circumferential extent. The latter groove is in constant communication with the groove 46 through a channel 53 in the core. The distributor body has also a bore 54 adapted to establish communication between the grooves 46 and 50. In this bore is slidably mounted a plug 55 which may be actuated by a bell crank lever 56 fulcrumed on the plate 4 and having one end received in the plug.

The two shafts 6 and 7 are further journaled by roller bearings 57 and 58 supported by the distributor core and end plate 5 respectively.

Within the housing 1, preferably near the wall thereof is journaled a rotor adjusting shaft 59 to which are keyed a pair of arms 60. To these arms are pivoted links 61 which are also attached to ears 62 projecting from the rotor flanges 33. It will be apparent that upon actuation of the shaft 59 the rotor may be moved with reference to the cylinder block.

For the purpose of avoiding the necessity of manual operation of the shaft 59 there is provided a pressure apparatus as disclosed in Figure 5. This mechanism consists of a pressure cylinder 63, inside the housing 1, containing a piston 64 having a rod 65 extending therefrom through the bottom of the cylinder and in the general direction of the shaft 59. Adjacent the cylinder is a valve chamber 66 separated therefrom by a wall 67. In the latter are cut two ports 68 adapted to bring the valve chamber into communication with the pressure cylinder at either side of the piston. The chamber contains a double headed valve 69 adapted to close or open both ports simultaneously. Pressure fluid is supplied to the valve chamber through a pipe 70 which is preferably connected to and fed from the groove 46. A stub shaft 71 is rotatably mounted in the housing wall in the vicinity of the pressure cylinder and valve chamber. This shaft has keyed thereto an exterior operating lever 72 and an inner link 73. To the latter is pivoted a link 74 which is attached to the lower end of the piston rod 65 by means of still another link 75. The lower end of the valve 66 is connected to approximately the mid point of the link 75 by means of a link 76. Finally, the shaft 59 carries another arm 77 also connected to the rod 65 by a link 78.

In order to operate this device to turn the shaft 59 for the purpose of adjusting the rotor in the tracks 29, the lever 72 is turned, for example in counter-clockwise direction with reference to Figure 5. The link 73 is thereby turned in the same direction, raising the member 74 and turning the link 75 about its pivotal connection with the piston rod 65. The link 76 and valve 69 are raised, bringing the upper bore 68 into communication with the pressure pipe 70 through the valve chamber 66. A downward pressure is thereby exerted on the piston 64 and transmitted through the rod 65 and link 78 to the arm 77 which finally turns the shaft 59 and causes it to move the rotor through the arms 60 and links 61. During the same downward movement of the piston, piston rod and associated parts, links 75 turns counterclockwise about its pivotal connection with the member 74. Consequently the link 76 moves also downwardly and returns the valve 69 to its original closed position. It will be apparent that the extent of movement of the piston 64, and eventually the rotor depends on the extent to which the lever 72 is moved. Graduations and locking notches may be formed on the outside of the housing 1 for the purpose of designating lever movements for various positions to which the rotor is to be adjusted.

Operation: In starting the device, the rotor may be eccentric or concentric with the cylinder block. In order to start, the plug 55 is withdrawn so that the groove 46 is in direct communication with the duct 49 through the bore 54. The driving shaft is now turned over whereupon the primary pistons 26 are reciprocated from the loose plate 10 eccentrically carried by the shaft 6. Fluid is pumped from the primary cylinders 22 through the conduits 44 and longer pocket 43 to the groove 46 from which it travels through the bore 54 to the duct 49. At the same time, two of the primary pistons are stroking in one direction and the other in the opposite direction due to their connection to the eccentrically mounted plate. Thus, while two of these pistons are compressing the remaining one is creating suction which acts in the remaining pocket 42 and draws the fluid which has been delivered to the duct 49. A circulation of fluid following the path of least resistance, is thus established among the primary cylinders 22 to the exclusion of the secondary cylinders 23. The primary pistons merely continue to reciprocate without imparting any movement to the associated parts and driven shaft 7.

The plug 55 is now inserted to break communication between the groove 46 and duct 49. The fluid forced through conduits 44 to the pocket 43 again enters the groove 46 and passes to the groove 52 through the channel 53 which communicates with the secondary cylinders (Figure 9).

Let it be assumed that the rotor is concentric with the cylinder block. In this case the secondary piston rods 36 are disposed radially to the rotor and block and consequently prevent any stroke of the secondary pistons 35 and circulation of pressure fluid in the secondary cylinders. Since circulation of fluid is now impossible among any of the cylinders, the primary pistons 26 can no longer reciprocate. Consequently the result of the movement of the plate 10 is merely to rotate the cylinder block 3 at the same angular velocity. The cylinder block is attached to the secondary shaft 7 by the plate 15, so that the driving and driven shafts move at the same speed. The rotor is also turned due to its connection to the cylinder block by the linkage 38—41.

In order to vary the speed of the driven shaft, the lever 72 is turned to shift the rotor into an eccentric relation with the cylinder block as already described. The piston rods 36 of the secondary unit assume a non-radial position relative to the rotor so that they are no longer bound. When the fluid flows from the primary cylinders to the secondary cylinders through the course outlined, the secondary pistons 35 are free to move. The outward thrust of some of the piston rods 36 exerts a push on the rotor about its centre of revolution, and the simultaneous inward movement of the remaining secondary pistons, illustrated in Figure 3, pulls the rotor in the same direction. The primary piston rods 27 have a similar action on the cylinder block when the primary pistons are being resisted on the compression stroke. The rotor turns the cylinder block through the linkages 38—41 and the block acts on the driven shaft 7 through the plate 15. It will be apparent that the speed of the driven shaft depends in inverse ratio on the stroke of the secondary piston rods, which in turn is dependent on the extent of eccentricity of the rotor with reference to the disc 8 or cylinder block 3.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, and means for rotatably supporting said rotor.

2. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, conduits extending from said primary and secondary cylinders, and means for establishing communication among said conduits.

3. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, a fixed distributor core surrounding said driving shaft, said shaft having a pair of pockets formed therein, a distributor body carried by said block and surrounding said core, conduits adapted to establish communication between said pockets and the primary and secondary cylinders, said core having a pair of grooves in permanent communication with said pockets.

4. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, a fixed distributor core surrounding said driving shaft, said shaft having a pair of pockets formed therein, a distributor body carried by said block and surrounding said core, conduits adapted to establish communication between said pockets and the primary and secondary cylinders, said core having a pair of grooves in permanent communication with said pockets, a sleeve surrounding the driving shaft at the pockets and disposed within said core, said sleeve having a slot establishing communication between one of the pockets and conduits from the primary cylinders, said sleeve being also spaced from one end of the remaining pocket to permit the latter to communicate with the conduits from the secondary cylinders.

5. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, and means for moving said rotor into eccentric positions with reference to said block.

6. A variable speed transmission apparatus comprising in combination with a driving and a driven shaft, a crank on the driving shaft, a plate loosely mounted on said crank, connections between said plate and the driven shaft to prevent the plate from binding on said crank, a cylinder block disposed in a plane perpendicular to the axes of the shafts, said block being connected to the driven shaft, primary and secondary cylinders formed in said block, primary and secondary pistons mounted in said cylinders respectively, piston rods extending from the primary pistons towards the centre of the block and joined to said plate, a rotor surrounding said block, piston rods extending from the secondary pistons and joined to said rotor, and means for rotatably supporting said rotor.

7. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, and an operative connection between the cylinder block and the rotor whereby the block and rotor move in unison.

8. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, and a link connection between the cylinder block and the rotor, whereby the block and rotor move in unison.

9. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for slidably and rotatably supporting said rotor, a control shaft operatively connected to the rotor and adapted to slide the same, and a pressure actuated device connected to said control shaft.

10. A variable speed transmission apparatus comprising in combination with a driving and a driven shaft, a crank on the driving shaft, a cylinder block disposed in a plane perpendicular to the axes of said shafts, said block being connected to the driven shaft, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, a fixed distributor core surrounding said driving shaft, said shaft having a pair of pockets formed therein, a distributor body carried by said block and surrounding said core, conduits adapted to establish communication between said pockets and the primary and secondary cylinders, said core having a pair of grooves in permanent communication with said pockets, a sleeve surrounding the driving shaft at the pockets and disposed within said core, said sleeve having a slot establishing communication between one of the pockets and conduits from the primary cylinders, said sleeve being also spaced from one end of the remaining pocket to permit the latter to communicate with the conduits from the secondary cylinders, and means for controlling communication between one of the grooves in the core and the slot in the sleeve.

11. A variable speed transmission apparatus comprising in combination with a driving and a driven shaft, a crank on the driving shaft, a cylinder block disposed in a plane perpendicular to the axis of said shafts, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, means for moving said rotor into eccentric positions with reference to said block, an operative connection between the cylinder block and the rotor whereby the block and rotor move in unison, and said block being joined to said driven shaft.

12. A variable speed transmission apparatus comprising in combination with a driving and a driven shaft, a crank on the driving shaft, a cylinder block disposed in a plane perpendicular to the axes of said shafts, primary and secondary cylinders formed in said block, primary and secondary pistons mounted in said cylinders respectively, piston rods extending from the primary pistons towards the centre of the block and joined to said crank, a rotor surrounding said block, piston rods extending from said secondary pistons and joined to said rotor, means for rotatably supporting said rotor, means for moving said rotor into eccentric positions with reference to said block, an operative connection between the cylinder block and the rotor whereby the block and rotor move in unison, said block being joined to said driven shaft, and means for establishing inter-communication among the primary cylinders.

In witness whereof I have hereunto set my hand.

ADOLF SCHNEIDER.